Patented Aug. 4, 1953

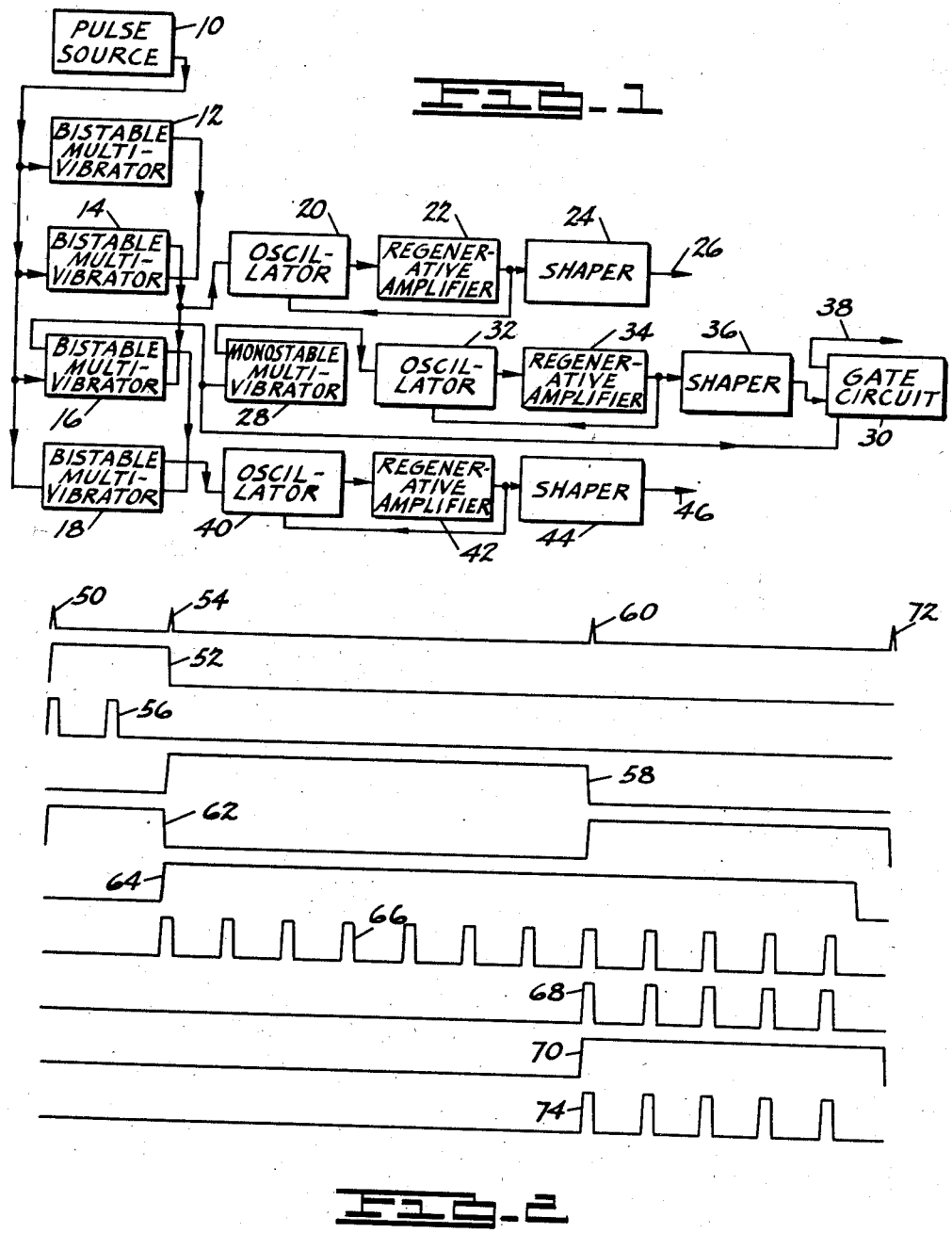

2,647,996

UNITED STATES PATENT OFFICE 2,647,996

COUNTING CIRCUIT

Alexander Greenfield, Detroit, Mich., assignor to Bendix Aviation Corporation, Detroit, Mich., a corporation of Delaware Application February 23, 1951, Serial No. 212,420

10 Claims. (Cl. 250—27)

This invention relates to a counting circuit and more particularly to a circuit for converting decimally inverse indications of a number into true numerical values.

In co-pending application Serial No. 166,462, filed June 6, 1950, by Charles A. Piper and Lowell R. Brown, a system has been disclosed for measuring a variable quantity such as temperature or pressure and for separating the various digits in the measurement. In one embodiment of the invention, alternate digits are converted into voltages directly proportional to the values of the digits and the other digits are converted into voltages proportional to the decimal complements of the digital values. For example, with a temperature measurement of 276° K., three voltages of 2, 3 and 6 volts are respectively produced and with a measurement of 145° K., voltages of 1, 6 and 5 volts are respectively produced.

The voltages which are produced are converted into a sequence of pulses spaced by intervals proportional to the voltages and the pulse sequence is transmitted to a central station for decoding, recording and analysis. Thus, for a measurement of 276° K., four pulses spaced by 90, 120 and 210 microseconds are produced when each integer in a digit is represented by a 30 microsecond interval and the value "0" is represented by an initial interval of 30 microseconds.

This invention provides a circuit for use at the ground station in determining the number of 30 microsecond intervals between each pair of pulses in a pulse sequence and for translating such determinations into indications of the digital values comprising the transmitted measurement. The circuit operates to provide a direct indication of the value of each digit, including those digits whose values were decimally inverted before transmission to the ground station.

An object of this invention is to provide a circuit for indicating the values of a plurality of digits.

Another object is to provide a circuit of the above character for decimally inverting the values of alternate digits in a digital sequence to obtain their true values.

A further object is to provide a circuit of the above character for converting the time period between each pair of successive pulses in a pulse sequence into a plurality of signals proportional to the time period.

Still another object is to provide a circuit of the above character for converting numerical information represented by the time periods between successive pulses in a pulse sequence into a positive form which can be easily stored for subsequent recordation and analysis.

A still further object is to provide a circuit of the above character for giving a reliable indication of the values of a plurality of digits for all possible combinations of digital values.

Other objects and advantages will be apparent from a detailed description of the invention and from the appended drawings and claims.

In the drawings:

Figure 1 is a circuit diagram, essentially in block form, of one embodiment of the invention; and Figure 2 illustrates voltage wave shapes at strategic terminals in the circuit shown in Figure 1.

In one embodiment of the invention, a source 10 of sequential pulses, such as a receiver at a ground station, is connected to the grids of the left tubes in bistable multivibrators 12, 14, 16 and 18. The plates of the right tubes in the multivibrators 12, 14 and 16 are connected to the grids of the right tubes in the multivibrators 14, 16 and 18, respectively.

The plate of the right tube in the multivibrator 14 is also connected to the input terminal of an oscillator 20, the output terminal of which is connected to a regenerative amplifier 22. The output from the regenerative amplifier 22 is introduced to a shaper 24 and to an input terminal of the oscillator 20, and the output from the shaper is taken from a lead 26.

The plate of the left tube in the bistable multivibrator 16 is connected to the grid of the left tube in a monostable multivibrator 28 as well as to the control grid of the pentode in a gate circuit 30. The plate of the left tube in the multivibrator 28 is connected to an oscillator 32, which is in cascade arrangement with a regenerative amplifier 34 and a shaper 36, the output from the amplifier 34 in turn being introduced back to an input terminal of the oscillator 32. The output from the shaper 36 is introduced to the suppressor grid of the pentode in the gate circuit 30 and the output from the pentode is taken from a lead 38.

The plate of the right tube in the multivibrator 18 is connected to the input terminal of an oscillator 40, the output terminal of which is connected to a regenerative amplifier 42. The output from the amplifier is introduced to a shaper 44 and to an input terminal of the oscillator 40, and the output from the shaper 44 is taken from a lead 46.

The left tube in the multivibrator 12 and the right tubes in the multivibrators 14, 16 and 18 are normally conducting. When a first pulse, indicated at 50 in Figure 2, is introduced from the source 10 to the multivibrator 12, the left tube in the multivibrator 12 becomes cut off and a positive pulse appears on its plate. Since the plate of one tube in each of the bistable multivibrators is connected to the grid of the other tube in the multivibrator, the positive pulse on the plate of the left tube in the multivibrator 12 appears on the grid of the right tube and causes the right tube in the multivibrator to conduct.

When the right tube in the multivibrator 12 starts to conduct, the negative pulse produced on its plate cuts off the right tube in the multivibrator 14 and produces a positive pulse, indicated at 52 in Figure 2, on the plate of the tube. This positive pulse 52 continues until the introduction of a second pulse, indicated at 54, which cuts off the left tube in the multivibrator 14 and causes the right tube in the multivibrator to conduct.

The positive pulse produced on the plate of the right tube in the multivibrator 14 during the period between the triggering pulses 50 and 54 biases the oscillator 20 sufficiently positive so that the oscillator conducts. A number of signals having a direct relationship to the time period between the pulses 50 and 54 is accordingly produced. For example, if the pulse 54 follows the pulse 50 by 120 microseconds, four oscillatory signals may be produced at 30 microsecond intervals. This represents the integer "3" since an initial interval of 30 microseconds is provided to represent the value "0." The regenerative amplifier 22 provides a feedback to maintain the operation of the oscillator 20 during the positive pulse 52, and the shaper 24 converts the oscillatory signals into an optimum shape for subsequent utilization, such as a square shape. The signals from the shaper 24 are illustrated at 56 in Figure 2.

The negative pulse produced on the plate of the right tube in the multivibrator 14 upon the introduction of the pulse 54 from the source 10 cuts off the right tube in the multivibrator 16 and produces a positive pulse, illustrated at 58 in Figure 2, on its plate. The pulse 58 on the plate of the right tube in the multivibrator 16 continues until the introduction from the source 10 of a third pulse 60, which causes the left tube in the multivibrator 16 to become cut off and the right tube in the multivibrator to start conducting. Since the voltage on the plate of the left tube in each multivibrator is high when the voltage on the plate of the right tube is low and vice versa, the voltage on the plate of the left tube is low during the period between the pulses 54 and 60 and high for the rest of the time, as illustrated at 62 in Figure 2.

Upon the formation of the negative pulse on the plate of the left tube in the multivibrator 16, the normally conductive left tube in the multivibrator 28 becomes cut off and a positive pulse, illustrated at 64 in Figure 2, is produced on its plate. The positive pulse 64 continues for a predetermined period of time before the left tube again starts to conduct, and during this period the oscillator 32 produces signals at the same frequency as the oscillator 20. For example, twelve signals are produced by the oscillator 32 at 30 microsecond intervals, when each such interval between pulses from the source 10 represents an integer. These oscillatory signals are squared by the shaper 36, as illustrated at 66 in Figure 2.

The signals 66 from the shaper 36 are introduced to the suppressor grid of the pentode in the gate circuit 39. However, the signals introduced to the gate circuit 30 between the pulses 54 and 60 do not pass through the gate circuit because of the negative pulse applied to the control grid of the pentode in the gate circuit during this period. These signals are in effect subtracted from the twelve signals produced by the oscillator 32 so that the number of signals actually passing through the gate circuit 38 represents the decimal complement of the value indicated by the number of suppressed signals. The signals passing through the gate circuit 30 are indicated at 68 in Figure 2.

For example, with a 210 microsecond period between the pulses 54 and 60, seven of the twelve signals produced by the oscillator 32 are prevented from passing through the gate circuit 30. The five signals passing through the gate circuit indicate the integer "4," which is the decimal complement of the value "6" represented by the 210 microsecond interval. The integer represented by the time period between the signals 54 and 60 is decimally inverted to obtain the true value of the second digit in a measurement, as disclosed in co-pending application Serial No. 166,462, filed June 6, 1950, by Charles A. Piper and Lowell R. Brown. As disclosed in the co-pending application, alternate digits are decimally inverted to facilitate their conversion into a sequence of pulses spaced in accordance with the digital values, the pulses being transmitted to a central station for decoding, recording and analysis.

The voltage on the plate of the right tube in the multivibrator 16 decreases upon the introduction of the pulse 60 from the source 10, as illustrated at 58 in Figure 2, and causes the right tube of the multivibrator 18 to become cut off. A positive pulse, illustrated at 70, appears on the plate of the right tube in the multivibrator 18 and this pulse continues until the introduction of a fourth pulse 72 from the sourec 10. During the production of the positive pulse 70, the oscillator 40 oscillates at the same frequency as the oscillator 20 and produces a number of signals which provide a direct indication of the digital value represented by the time period between the pulses 60 and 72. These oscillatory signals are squared by the shaper 44, as illustrated at 74 in Figure 2.

There is thus provided a circuit for converting the time periods between adjacent pulses into a number of signals proportional to the numerical value represented by the time periods. The circuit operates to indicate the decimal complements of the numbers represented by the time periods between predetermined pulses so as to provide a correct indication of certain digital values. At the same time, the circuit operates to introduce into separate channels the signals produced between each pair of successive pulses to facilitate the storage of the signals until the information which they represent can be recorded.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination, first, second and third channeling means adapted to provide activated channels during the periods between successive pairs of sequential pulses, means associated with the first and third channeling means and operative upon the activation of the first and third channels to produce a plurality of oscillatory signals proportional to the spacings between pulses, means associated with the second channeling means and operative upon the activation of the second channel to produce a predetermined number of oscillatory signals, and means associated with the channeling means and the oscillatory means in the second channel for quenching the oscillatory signals produced during the activation of the second channel to produce a number of signals decimally complementary to the value represented by the quenched signals.

2. In combination, means for channelizing pairs of successive pulses in a pulse sequence and for activating each channel during the period defined by the pair of pulses introduced to the channel, means associated with a first group of channels for producing in each channel in the first group of channels a plurality of oscillatory signals proportional to the activation period of the channel, means associated with a second group of channels for producing in each channel in the second group of channels a predetermined number of oscillatory signals, and means associated with the second group of channels for subtracting from the predetermined number of oscillatory signals produced in each channel in the second group a plurality of signals proportional to the activation period of the channel.

3. In combination, means for channeling pairs of successive pulses in a pulse sequence and for activating each channel during the period defined by the pair of pulses introduced to the channel, means associated with a first group of channels for producing in each channel in the first group of channels a plurality of oscillatory signals proportional to the activation period of the channel, means associated with a second group of channels for producing in each channel in the second group of channels a predetermined number of oscillatory signals, and means individually connected to each channeling means in the second group and to the oscillatory means associated with the channeling means and operative to quench the oscillatory signals during the activation of the channel.

4. In combination, first, second and third channeling means adapted to provide activated channels during the periods between successive pairs of pulses, first and third oscillators each operative upon the activation of their associated channel to produce a number of signals proportional to the spacings between pulses, means operative upon the activation of the second channel to activate an auxiliary channel for a predetermined period of time, a second oscillator operative during the activation of the auxiliary channel to produce a predetermined number of signals, and means for blocking the passage of the oscillatory signals through the auxiliary channel during the activation of the second channel to produce a number of signals having a decimally inverse relationship to the number of blocked signals.

5. In combination, means for activating a plurality of main channels in sequence in accordance with the time periods between pairs of successive pulses in a pulse sequence, means for producing in each of predetermined main channels in the plurality a number of oscillatory signals proportional to the activation period of the channel, means operative upon the activation of each of the other main channels in the plurality to activate for a predetermined period of time an auxiliary channel associated with the main channel, means for producing in the auxiliary channels a predetermined number of signals, and means for blocking the passage of signals from each auxiliary channel during the activation of the associated main channel so as to produce a number of signals proportional to the decimal complement of the number of blocked signals.

6. In combination, means for producing a sequence of pulses, means for producing a plurality of channels each activated by successive pairs of pulses in the sequence, means for producing in each of predetermined channels in the plurality a number of signals related to the period of time that the channel is activated, means for producing in each of the other channels in the plurality a predetermined number of signals, and means for quenching from the predetermined number of signals in each of the last mentioned channels a plurality of signals related to the period of time that the channel is activated.

7. In combination, means for producing a sequence of pulses, means for producing a plurality of channels each activated by successive pairs of pulses in the sequence, means operative upon the activation of each of predetermined channels in the plurality to produce in the activated channel a number of signals proportional to the period of time that the channel is activated, means operative upon the activation of each of the other channels in the plurality to produce a predetermined number of signals in the channel, and means connected to the channeling means in each of the channels having the last-mentioned signal-producing means and operative during the activation of the channel to quench the signals produced by the signal-producing means.

8. In combination, means for producing a sequence of pulses, a plurality of bistable multivibrators connected to one another in cascade arrangement, each multivibrator being activated in sequence during the period between a successive pair of pulses, a first plurality of oscillators, each oscillator being connected to a different one of predetermined multivibrators in the cascade arrangement to produce a plurality of signals dependent upon the time during which the associated multivibrator is activated, a plurality of monostable multivibrators, each monostable multivibrator being connected to a different one of the other bistable multivibrators in the cascade arrangement to produce a pulse for a predetermined period of time, a second plurality of oscillators, each oscillator in the second plurality being associated with a different monostable multivibrator to produce a predetermined number of signals during the production of the pulse by the multivibrator, and a plurality of gating circuits, each gating circuit being connected to a different oscillator in the second plurality and its associated bistable multivibrator to quench the signals produced by the oscillator during the activation of the multivibrator.

9. In combination, means for producing a sequence of pulses, a plurality of bistable multivibrators connected to one another for activation in sequence during the periods between successive pairs of pulses, a first plurality of oscillators, each oscillator being associated with a different one of predetermined multivibrators in the plurality to form a channel for the production of signals at periodic intervals during the activation of its associated multivibrator, a plurality of monostable multivibrators, a second plurality of oscillators, each oscillator in the second plurality being associated with a different monostable multivibrator and a different one of the remaining bistable multivibrators in the plurality to form a channel, the monostable multivibrator in each channel being activated for a predetermined period of time upon the activation of the associated bistable multivibrator to trigger the associated oscillator into producing signals at periodic intervals during its activation, and a plurality of gate circuits, each gate circuit being connected in a different one of the channels having a monostable multivibrator to quench the signals produced by the oscillator in the channel during the activation of the associated bistable multivibrator.

10. In combination, means for producing a sequence of pulses, a plurality of bistable multivibrators connected to one another in cascade arrangement for activation in sequence by successive pulses, a first plurality of oscillators, each oscillator forming a channel with a different one of predetermined multivibrators in the plurality and being connected to the multivibrator for the production of signals at periodic intervals during the activation of the multivibrator, a plurality of monostable multivibrators, a second plurality of oscillators, each oscillator in the second plurality forming a channel with a different monostable multivibrator and a different one of the remaining bistable multivibrators in the plurality, each monostable multivibrator being connected to its associated bistable multivibrator for activation for a predetermined period of time upon the activation of the bistable multivibrator, each oscillator in the second plurality being connected to its associated monostable multivibrator for the production of siginals at periodic intervals during the activation of the multivibrator, and a plurality of gate circuits, each gate circuit being connected to a different oscillator in the second plurality and its associated bistable multivibrator to quench the signals produced by the oscillator in the channel during the activation of the bistable multivibrator.

ALEXANDER GREENFIELD.

References Cited in the file of this patent

UNITED STATES PATENTS

| Number | Name | Date |
|---|---|---|
| 2,485,886 | Johnstone et al. | Oct. 25, 1949 |